June 27, 1967

C. G. VINER 3,327,944

AUTOMATIC BALANCE VALVE

Filed June 9, 1965

INVENTOR.
CHARLES G. VINER

BY
McCormick, Paulding & Huber

ATTORNEYS

United States Patent Office 3,327,944
Patented June 27, 1967

3,327,944
AUTOMATIC BALANCE VALVE
Charles G. Viner, P.O. Box 127, Old Turnpike Road,
North Woodstock, Conn. 06257
Filed June 9, 1965, Ser. No. 462,533
5 Claims. (Cl. 236—1)

This invention relates to balance valves for use in the return lines of fluid fed heat exchanging units or branches of a heating or cooling system, and deals more particularly with a valve which automatically regulates the flow of heat exchanging fluid in such a return line to optimize the fluid temperature differential across the heat exchanging unit or branch. The balance valve of this invention is in many respects similar to that described and illustrated in my copending U.S. patent application Ser. No. 438,519, filed Mar. 10, 1965, now abandoned, and entitled, Automatic Balance Valve for Heat Exchanging Fluid.

A general object of the present invention is to provide a balance valve for use in the return line of the heat exchanging unit or branch, which valve automatically regulates the flow of fluid being circulated through said unit, or branch, to maintain a relatively constant fluid temperature differential thereacross.

Another object of the present invention is to provide a dual range balance valve for maintaining a first predetermined temperature range across a heat exchanging unit or branch when the same is used as a heater, and for maintaining a second predetermined temperature range thereacross when said unit or branch is used for cooling purposes.

Another object of this invention is to provide a balance valve of the foregoing character which is readily adjusted from outside the valve body to cause it to operate at the desired temperatures.

Still another object of the present invention is to provide a balance valve for a hot water radiator adapted to receive hot water at a constant temperature, which valve is responsive to fluctuations in the temperature of the water being discharged from said radiator and automatically decreases or increases the flow of water to the radiator so as to maintain the drop in water temperature across the radiator within a predetermined range.

Still another object of the present invention is to provide a balance valve for a cold water cooling unit adapted to receive cold water at a constant temperature, which valve is responsive to fluctuations in the temperature of the water being discharged from said unit and automatically decreases or increases the flow of water through the unit so as to maintain the rise in water temperature across the unit within a predetermined range.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
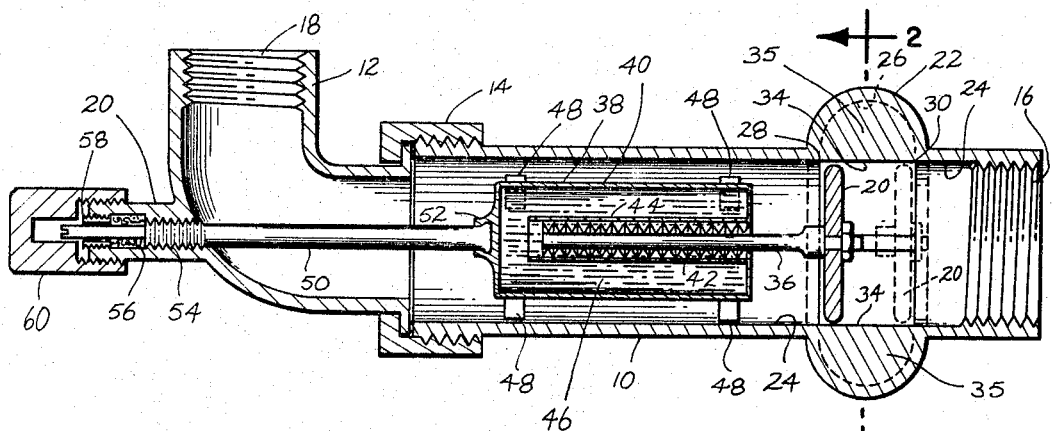
FIG. 1 is a longitudinal sectional view taken through a balance valve embodying the present invention, the solid lines of this view showing the valve element near one limit of its movement and the broken line showing it near the other limit of its movement.
Figure 2:
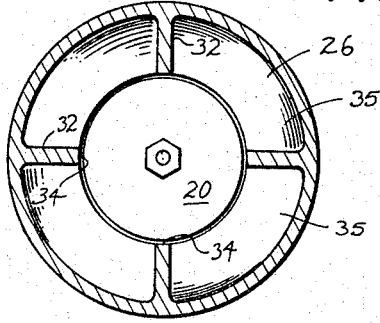
FIG. 2 is a transverse sectional view of the FIG. 1 valve taken along line 2—2 of that figure.

Referring now to the drawing in greater detail, FIGS. 1 and 2 show a balance valve of the present invention for connection between two right angle sections of return pipe in a heating or cooling system which circulates a heat exchanging fluid. As shown, the valve comprises a hollow housing comprised of a generally straight cylindrical section 10 and an elbow section 12 joined by a union nut 14. At the free end of the cylindrical section 10 is an inlet port 16 and at the free end of the elbow section 12 is an outlet port 18, the housing sections 10 and 12 being internally threaded at said ports for connection to sections of pipe or the like in the system with which the valve is used. Included in the elbow section is an outwardly protruding stem or boss 20 having a bore passing therethrough with its axis generally aligned with the longitudinal axis of the section 10.

For cooperation with a valve element 20 of generally circular cross section, for controlling the flow of fluid through the valve, the housing section 10, adjacent the inlet port 16, includes a circumferentially extending and outwardly bulging portion 22. In its interior, the housing section 10 includes two cylindrical surfaces 24, 24 located on either side of the outwardly bulging portion 22. The two surfaces are of the same diameter and are axially aligned with each other. In the region of the outwardly bulging portion 22, however, the internal surface of the housing extends radially outwardly as indicated at 26, and is of larger diameter than the surfaces 24, 24. As shown in FIG. 1 the outwardly extending portion 26 of the interior surface is, in longitudinal section, preferably symmetrical about a plane passing through the midpoint of its length, the surface 26 at one end starting at a corner 28 with the adjacent surface 24, increasing to a maximum diameter and then symmetrically returning to another corner 30 with the other surface 24.

The valve element 20 moves axially along the length of the outwardly bulging housing portion 22 and to radially guide the element in this movement the portion 22 further preferably includes a number of angularly spaced fins or ribs 32, 32 having radially inwardly directed faces 34, 34, which are radially spaced from the longitudinal axis of the section 10 by distances equal to the radii of the surfaces 24, 24 so as to smoothly blend with the surfaces 24, 24. It will therefore be noted that axially between the two corners 28 and 30 and angularly between the ribs 32, 32 the surface 26 defines a number of outwardly extending recesses 35, 35 which permit fluid to flow radially outwardly and around the valve element 20 when the valve element is located between and some distance from both of the surfaces 24, 24. It should also be noted that, at least along its outer circumferential edge portion, the valve element has an axial thickness substantially less than the spacing between the two corners 28 and 30 so when located near one of said corners it is spaced by a relatively large distance from the other corner. The valve element 20 also has a maximum diameter substantially equal to that of the two surfaces 24, 24 so that when aligned with either of said two surfaces it blocks the flow of fluid through the valve. Preferably, however, the valve element has a slightly smaller diameter than the surfaces 24, 24 so that even when aligned with one of said surfaces a small leakage flow will occur through the valve equal to approximately 5% of full flow.

The valve element 20 is fixed to one end of an actuating stem 36 which in turn is connected to and positioned by a thermostatic actuator 38 housed in the housing section 10 between its outwardly bulging portion 22 and the elbow section 12. The thermostatic actuator 38 may take various different forms, but preferably, and as shown, comprises an outer generally cylindrical shell 40 and an internal bellows 42. The bellows 42 is guided in its movement relative to the shell 40 by a cylindrical guide 44 fixed to the shell 40 and is surrounded by an actuating fluid 46 contained in the shell 40. The actuating stem 36 extends through the bellows 42 and is fixed to the inner end of the bellows as shown. As the actuating fluid changes in temperature, the pressure exerted on the bellows varies to cause the latter to compress or elongate to move the stem 36 and the valve element 20 axially in one direction or the other relative to the valve housing.

The thermostatic actuator 38 is radially retained in place in the valve body section 10 by a number of radially outwardly extending shoes or posts 48, 48 which are fixed to the shell 40 and which slidably engage the internal surface of the valve body section 10 to permit the actuator to be moved to different axial positions relative to the valve body. This positioning of the actuator relative to the valve body is accomplished by an adjustment stem 50 which is rotatably connected to the closed end of the actuator shell as shown at 52. The other end of the adjustment stem 50 extends through the bore of the boss 20 and is threadably connected therewith as shown at 54. Outwardly of the threaded section of the stem 50, is a cylindrical portion of the stem which is surrounded by packing material 56 held in place by a packing nut 58 also threaded into the bore of the boss 20. The adjustment stem 50 extends beyond the packing nut 58 and is slotted to receive a screwdriver or other tool for rotating it. This free end of the adjustment stem 50 is preferably normally covered by a protective cap 60 threaded onto the boss 20 as shown. From the foregoing, it will therefore be understood that by removing the cap 60 and rotating the adjustment stem 50 by a screwdriver or the like the stem may be threaded axially into or out of the elbow section to adjust the axial position of the thermostatic actuator 38 relative to the housing section 10. This in turn adjusts the axial position of the valve element 20 relative to the outwardly bulged valve body portion 22.

Considering now the operation of the valve shown in FIGS. 1 and 2, the valve is intended for use in the return line of a heat exchanging unit or branch of a heating or cooling system. As so used, the valve functions as a moderating valve to balance the various heat exchanging units or system branches against one another to prevent excessive temperature differentials from occurring across one or more of the units or branches. In a heating system, for example, a particular hot water radiator receives heated water at a preferably fixed or constant temperature which may for example, be taken to be approximately 170° F. A radiator unit dissipates heat through the surrounding space and ideally discharges this water at another fixed or constant temperature which may, for example, be taken to be approximately 150° F. If the space requires more heat, the preferred approach is to increase the flow of water through the associated radiator so that the discharge temperature is not lowered excessively. Therefore, in using the illustrated balance valve, the valve is installed at the discharge end of the radiator, or at the end of a branch of the heating system, and is then adjusted, by removing the cap 60 and rotating the stem 50 with a screwdriver or the like, until the desired temperature across the radiator or branch is obtained. For example, in the example given, the valve is adjusted until the water discharged from the radiator is discharged at a temperature of approximately 150° F. to produce a 20° temperature drop across the radiator. With the valve so adjusted, the valve element 20 will be positioned at about the position shown by the broken lines of FIG. 1 so as to be adjacent the corner 30 and therefore in a blocking or closed position with regard to the flow of heating fluid through the valve. As mentioned previously, however, the diameter of the disk 20 is slightly less than the diameter of the internal surface 24 so that even when the disk is in this position, a small leakage flow of the order of about 5 percent (5%) of full flow will occur through the valve. Therefore, the thermostatic element 38 is at all times subjected to heating fluid at the discharge temperature of the radiator.

With the valve in the closed or broken line position of FIG. 1, assume that the heating load on the associated radiator is increased, for example, by the outside temperature dropping or by the opening of a window in a room containing the radiator with which the valve is associated. As a result of this change in the load, the radiator will transfer more heat to the surroundings and the temperature at the discharge end of the radiator will drop. This drop in temperature in turn causes the actuator 38 to move the valve element 20 to the left, as viewed in FIG. 1, and to accordingly increase the space between the valve element 20 and the corner 30 to permit a greater flow of heating fluid through the valve. Accordingly, more of this heating fluid is permitted to flow through the radiator. As more heating fluid does flow through the radiator, the temperature at the discharge side again rises and the valve responds by moving toward a more closed position. It will, therefore, be obvious that the valve acts to modulate the flow through the radiator or the branch to maintain the flow at a rate sufficient to meet the heating load without drastically changing the temperature at the discharge side of the radiator.

In addition to its operating in the above-described manner in connection with a heating situation, the valve of FIGS. 1 and 2 is also capable of controlling the flow of cooling fluid through an associated heat exchanging unit used for cooling purposes. When the valve is used in a cooling system, it is attached to the discharge side of a heat exchanging unit through which chilled water or other cooling fluid is passed, which heat exchanging unit may be the same unit as used for heating during other seasons of the year. In a particular cooling system, the desired temperature of the cooling fluid at the discharge end of the heat exchange unit may, for example, be about 40° F. Therefore, the actuator 38 may be so chosen or designed that in going from the desired temperature of 170° F. for the heating fluid to the desired temperature of 40° F. for the cooling fluid, the valve elemnt 20 is moved from the broken line position of FIG. 1 to the full line position, or from the corner 30 to the corner 28. The valve element in the full line position of FIG. 1 located adjacent the corner 28 so as to again be in a closed or blocking position with regard to flow through the valve. If the discharge temperature of the heat exchanging unit used for cooling is 40° F., the valve will remain in the fully closed condition and only the leakage flow will occur therethrough. Now, if the cooling load on the heat exchanging unit increases, the temperature of the discharge water will rise and will cause the actuator 38 to move the valve element 20 to the right, as viewed in FIG. 1, to a more open position relative to the corner 28, and thereby will permit more cooling fluid to flow through the heat exchanger unit. As more cooling fluid passes through the heat exchanging unit, the discharge temperature will drop and the actuator will operate to return the valve element toward its closed position. The result of this is a modulating action which adjusts the flow through the heat exchanging unit so as to meet the cooling load while nevertheless maintaining the discharge temperature, or the discharge drop across the heat exchanging unit, at approximately the design requirement of the cooling system.

Figure 4:
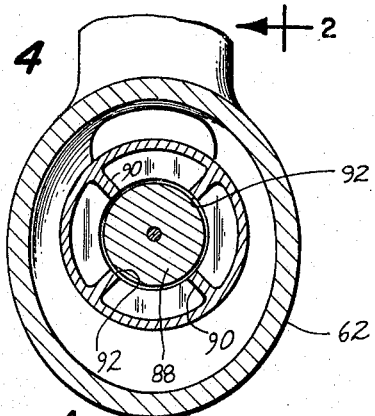
FIG. 4 is a sectional view of the FIG. 3 valve taken along the line 4—4 of that figure.
Figure 3:
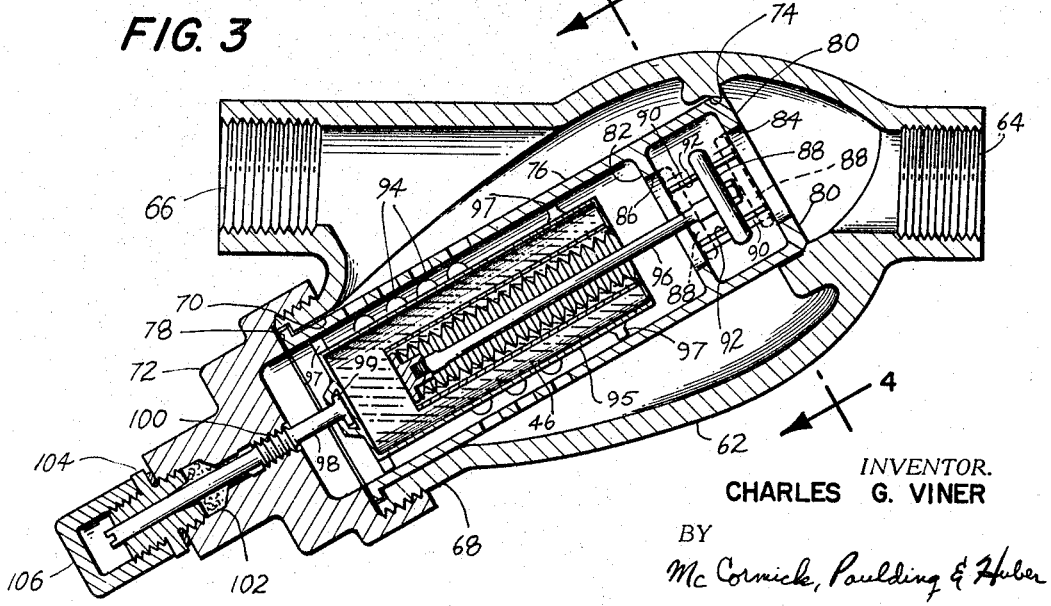
FIG. 3 is a longitudinal sectional view of a valve comprising an alternative embodiment of the present invention, the solid lines of this view showing the valve element near the middle of its range of movement and the broken lines showing it near the two limits of its movement.

FIGS. 3 and 4 show an alternative form of the invention comprising a valve adapted for connection between two aligned sections of a return pipe in a heating or cooling system, the valve in this case being referred to as a straight-through valve. As shown in these figures, the valve comprises a unitary hollow housing 62 having aligned inlet and outlet ports 64, 66 respectively, and a generally cylindrical portion 68 which is arranged with its axis at an angle to the axis of the ports 64 and 66. This latter portion is open at its outer end and includes a generally cylindrical internal surface 70. The portion 68 is externally threaded adjacent its outer end and the opening provided thereby is normally closed by a cap 72 threadably received thereon and having a smaller bore extending therethrough and communicating with the hollow interior of the housing 62. Adjacent the inlet port 60 the valve body in the interior portion thereof includes an annular wall which defines a seat 74 having its central axis aligned with the cylindrical surface 70. This seat surrounds and defines a circular opening through which all fluid passing from the inlet port 64 to the outlet port 66 is constrained to pass.

For controlling the flow of fluid through the valve, the valve of FIGS. 3 and 4 includes an elongated tubular element 76 which at one end is seated in the seat 74 and which at its other end is radially seated against the cylindrical surface 70 and axially held in place by a radial shoulder 78 on the cap 72. At the end engaging the seat 74, the element 76 includes two axially spaced and radially inwardly extending annular walls 80, 82 having inwardly directed cylindrical surfaces 84, 86 of equal diameter axially aligned with one another. A valve element 88 moves between the annular walls 80, 82 and is guided by a number of ribs 90, 90 extending axially between the walls 80, 82 and having faces 92, 92 forming part of the same imaginary cylindrical surface as the surfaces 84, 86. Therefore, it will be seen that between the two walls 80, 82 the internal surface of the element 76 is located outwardly from the end faces 84, 86 to form a number of radially outwardly extending recesses between the ribs 90, 90 which permit the flow of fluid around the valve element when the latter is positioned intermediate and spaced from both end faces 84 and 86 as shown by the solid lines of FIG. 3. Therefore, when the valve element 88 is positioned at or near either one of the walls 80, 82, the valve is closed and when the valve element 88 is positioned intermediate the walls 80, 82 the valve is open. The diameter of the valve element 88 is, however, slightly less than the diameter of the wall faces 84 and 86 so that even when in its fully closed position a small leakage flow will occur through the valve equal to approximately five percent (5%) of the full flow. Fluid which flows past the valve element 88 and into the interior of the tubular element 76 flows out of the tubular element and to the outlet port 66 through a number of openings 94, 94 formed in the side wall of the element 76.

Movement of the valve element 88 is effected by a thermostatic actuator 95 located in the tubular element 76 adjacent the cap 72. The actuator 95 is or may be generally similar to the actuator 38 of the FIG. 1 valve and it is connected to the valve element 88 by an actuating stem 96. As the actuating fluid contained in the actuator 95 changes in temperature as a result in changes in the temperature of the heat exchanging fluid flowing through the valve, the bellows of the actuator contracts or expands to move the actuating stem 76 and the valve element 88 relative to the stem 76.

For adjusting the valve to operate at desired temperatures, the actuator 95 is slidably received in the tubular member 76 and radially supported therefrom by a number of shoes or support posts 97, 97 fixed to the outer surface of the actuator and slidably engaging the internal surface of the tubular member 76. An adjustment stem 98 is rotatably connected to the outer end of the actuator 95, as at 99, and extends through the bore of the cap 72, to which it is threadably connected as at 100. Outwardly of its threaded section the adjustment stem 98 is surrounded by a quantity of packing material 102 which is held in place by a packing nut 104. The stem extends outwardly beyond the packing nut 104 and is slotted to receive a screwdriver or similar tool for rotating it to change the axial position of the actuator relative to the tubular portion 76 and to thereby change the axial position of the valve element 88 relative to the two walls 80 and 82. The protruding end of the adjustment stem 98 is preferably covered by a protective cap 106 which, as shown, may be threaded onto the outer end of the packing nut 104.

The operation of the valve of FIGS. 3 and 4 is substantially identical to that of the valve shown in FIGS. 1 and 2. More particularly, when used in connection with a heating fluid, the valve element 88 will be positioned at or near the wall 80 and will move small distances toward or away from the wall 80 to increase or decrease the flow of heating fluid through the valve in response to changes in the temperature of the heating fluid. Similarly, when used in connection with a cooling fluid, the valve element 88 will be positioned at or near the wall 82 and will move small distances toward or away from the wall 82 to vary the flow of cooling fluid to the valve in response to changes in the temperature. Furthermore, the range of movement of the actuator 95 and the axial displacement of the walls 80 and 82 from one another is such that the valve will automatically adjust itself for use with heating or cooling fluid, the valve element moving toward the wall 80 when used with heating fluid and moving toward the wall 82 when used with cooling fluid. Therefore, the valve may be used with a heat exchanging unit used both for air conditioning in the summertime and for heating in the wintertime, and if the actuator and the spacing of the walls 80 and 82 are properly matched to each other, no change or adjustment of the valve need be made when making the conversion from heating to cooling or vice versa.

I claim:

1. An automatic balance valve comprising a hollow housing having axially aligned inlet and outlet ports and providing a path for the flow of fluid between said ports, a generally cylindrical portion of said housing defining a generally cylindrical opening having its axis inclined relative to said ports, a cap closing said opening, means in said housing defining a seat having a central axis aligned with that of said opening, a tubular element retained in said housing by engagement at one end with said seat and by engagement at the other end with the surface of said cylindrical opening and with said cap, said tubular element at the end adjacent said seat having an opening through which all fluid passing through said housing is constrained to flow and having at least one opening in its side wall for the flow of fluid therethrough, two axially spaced and radially inwardly extending annular walls on said tubular element at the end thereof adjacent said seat and defining two inwardly facing cylindrical surfaces, said two cylindrical surfaces being of the same diameter and being coaxial with each other, a valve element of circular cross section movable between said two surfaces, said valve element having a diameter substantially equal to that of said two surfaces so as to block the flow of fluid through said valve when axially aligned with either one of said two surfaces and along its circumferential edge portion having an axial thickness substantially less than the spacing between said two surfaces, and a thermostatic actuator in said tubular element and exposed to the fluid flowing therethrough for axially moving said valve element in response to changes in the temperature of said fluid.

2. An automatic balance valve as defined in claim 1 further characterized by an adjustment stem connected with said actuator and passing though and threadably connected with said cap for moving said actuator axially of said tubular element in response to rotation of said adjustment stem.

3. An automatic balance valve comprising a housing having inlet and outlet ports and providing a path for the flow of fluid between said ports, said housing including a generally tubular portion through which said fluid is adapted to flow, said tubular housing portion defining axially spaced cylindrical surfaces of equal diameters, a circular valve element between said cylindrical surfaces and having a diameter substantially equal to that of said two surfaces and an axial thickness adjacent its circumference substantially less than the spacing between said two surfaces, said housing portion between said two surfaces including a plurality of circumaxially spaced ribs each of which has a radially inwardly facing guide surface engageable with the circumference of said valve element, and all of said ribs defining a plurality of radially outwardly extending recesses to permit the flow of fluid around said valve element when said element is located between said two cylindrical surfaces, a thermostatic actuator in said housing and exposed to the fluid flowing therethrough, an actuating stem connected at one end to said valve element and at its opposite end to said actuator, and an adjustment stem opposite said actuating stem and connected at one end to said actuator and having its opposite end extending through and beyond the wall of said housing, said adjustment stem having a threaded connection with said housing wall so that rotation of said extending actuating stem portion causes axial movement of both said actuator and said valve element in said housing.

4. An automatic balance valve as defined in claim 3 further characterized by said housing being comprised of a generally straight section and an elbow section each providing one of said ports and with said generally straight section including said two cylindrical surfaces and said recess, said thermostatic actuator being located between said recess and the port provided by said elbow section, an outwardly protruding boss on said elbow section having a bore aligned with the axis of said generally straight section, and said adjustment stem passing through and threadably connected with said boss and connected at its inner end to said actuator for moving said actuator axially of said generally straight housing section in response to rotation thereof.

5. An automatic balance valve as defined in claim 3 wherein said thermostatic actuator comprises a fluid filled outer shell having one end rotatably connected to said adjustment stem, a bellows inside said shell and having an outer end connected to the opposite end of said shell from said adjustment stem associated end, and said actuating stem extending into said shell and through said bellows and connected to the inner end of said bellows.

References Cited

UNITED STATES PATENTS

| | | | |
|---|---|---|---|
| 1,845,027 | 2/1932 | Lonergan | 236—102 |
| 2,495,226 | 1/1950 | Crago | 236—1 |
| 2,575,100 | 11/1951 | Duey | 236—93 |
| 2,776,796 | 1/1957 | Mosely | 236—1 |
| 3,179,337 | 4/1965 | Bauerlein | 236—1 |

EDWARD J. MICHAEL, *Primary Examiner.*